(12) United States Patent
Turek et al.

(10) Patent No.: US 6,429,878 B1
(45) Date of Patent: Aug. 6, 2002

(54) DISPLAY OF TEXT ON MEDICAL IMAGES

(75) Inventors: Matthew W. Turek, Glenville, NY (US); William M. Stoval, Mt. Prospect, IL (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/473,389

(22) Filed: Dec. 28, 1999

(51) Int. Cl.7 .................................................. G06T 11/60
(52) U.S. Cl. ...................................................... 345/636
(58) Field of Search ................................. 345/629, 632, 345/634, 636, 639

(56) References Cited

U.S. PATENT DOCUMENTS 4,749,990 A  *  6/1988  Birkner
5,740,801 A  *  4/1998  Branson
5,896,131 A  *  4/1999  Alexander

OTHER PUBLICATIONS

Foley, et al., Computer Graphics Principles and Practice, second edition in C, Addison–Wesley Publishing Company, Jul. 1997, pp. 835–842.*

*The Sun™ Ultra™ 5 and Ultra 10 Workstation Architecture*, Technical White Paper, Sun Microsystems, Inc., May 1999, pp. 1–52.

* cited by examiner

*Primary Examiner*—Jeffery Brier
(74) *Attorney, Agent, or Firm*—Quarles & Brady LLP

(57) ABSTRACT

A graphic workstation receives digitized medical images and the user creates textual information that is to be displayed on the images. Instead of overlaying the text, the text data is blended with the image data such that the text appears semi-transparent and when displayed the underlying image data may be seen. The medical image may be fully restored from the blended image by a calculation based upon the blended image, the text data and alpha.

12 Claims, 3 Drawing Sheets

DISPLAY OF TEXT ON MEDICAL IMAGES

BACKGROUND OF THE INVENTION

The field of the invention is medical imaging, and particularly, the processing of medical images in preparation for review by a doctor.

Text is often overlaid on top of medical images prior to review by a doctor or medical technologist. The medical images are two or three-dimensional arrays of digitized data that are produced by imaging equipment such as MRI systems, x-ray systems, CT scanners, PET scanners and nuclear medicine systems. This digital data is downloaded to a workstation where textual information is added by drawing fully opaque characters on top of the displayed image. Such textual characters obliterate the underlying image on the final image. In addition, the methods currently used for saving an image with text annotation destroys the underlying image data. The pixel values for the image data are replaced with the pixel values of the text annotation. The image data can never be restored when the image is saved in this manner.

Obscuring image data with textual characters is a particular problem in several situations. Displaying many images at the same time results in very small image size and allows limited space for textual information. Typically, the amount of text allowed on multi-image displays must be drastically reduced to prevent overwriting the image. Another situation arises when a region of interest ("ROI") in an image is to be labeled. By definition, a region of interest is an area of importance to the reviewer. Numbering or labeling of multiple ROIs is a common practice which can lead to the obscuring of valuable clinical information underneath the ROI labels.

The above problems are exacerbated when patient information or ROI labels on an image are internationalized. Internationalization leads to longer strings of text which need to be displayed and which increase the likelihood that clinically useful image data is obscured.

SUMMARY OF THE INVENTION

The present invention enables textual information or labels to be added to medical images without obscuring the underlying image data. Instead of adding opaque text or labels over the image data, the data to be rendered over the image data is blended therewith to produce semi-transparent text or labels. The underlying image data can still be seen under the text or labels, and the image data can be fully restored if necessary by reversing the blending operation.

DESCRIPTION OF THE PREFERRED EMBODIMENT

Figure 1:
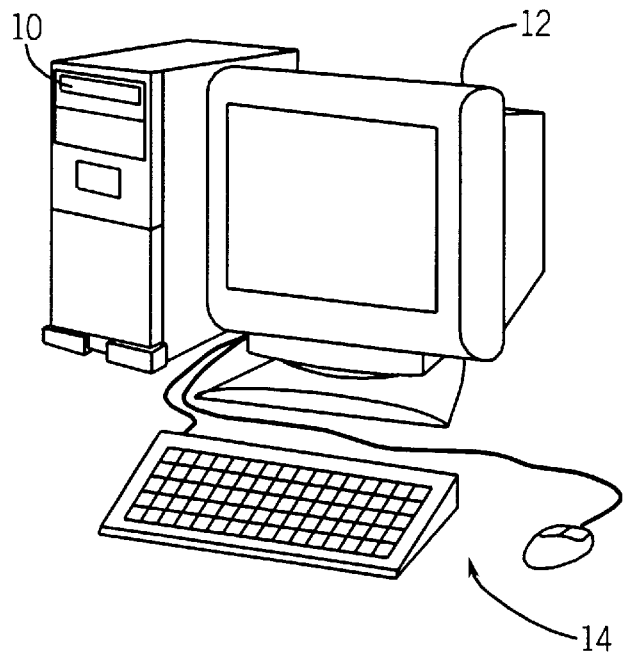
FIG. 1 is a perspective view of a workstation which has been modified to practice the preferred embodiment of the invention.

The preferred embodiment of the invention is employed in a workstation. As shown in FIG. 1 the workstation includes a mini-tower 10 which houses the processor and associated circuitry, memory, and peripheral interface circuits. One of the peripheral devices is a commercially available CRT monitor 12 which connects to a graphics circuit housed in the mini-tower 10, and another peripheral device is a keyboard and mouse 14 that connects to a PCI-based keyboard and Ethernet controller in the mini-tower 10. An operator may input data through the keyboard and control the position of a cursor on the monitor display using the mouse. The workstation 10 may operate as a stand alone graphic display system, or it may be connected to receive digitized image data directly from a medical imaging system such as an x-ray system, x-ray CT system, MRI system, PET scanner system or nuclear medicine system. The workstation 10 typically contains application programs which perform image processing functions, such as, filtering the medical images, transforming the size and orientation of the medical images and adding textual information to the medical images.

Figure 2:
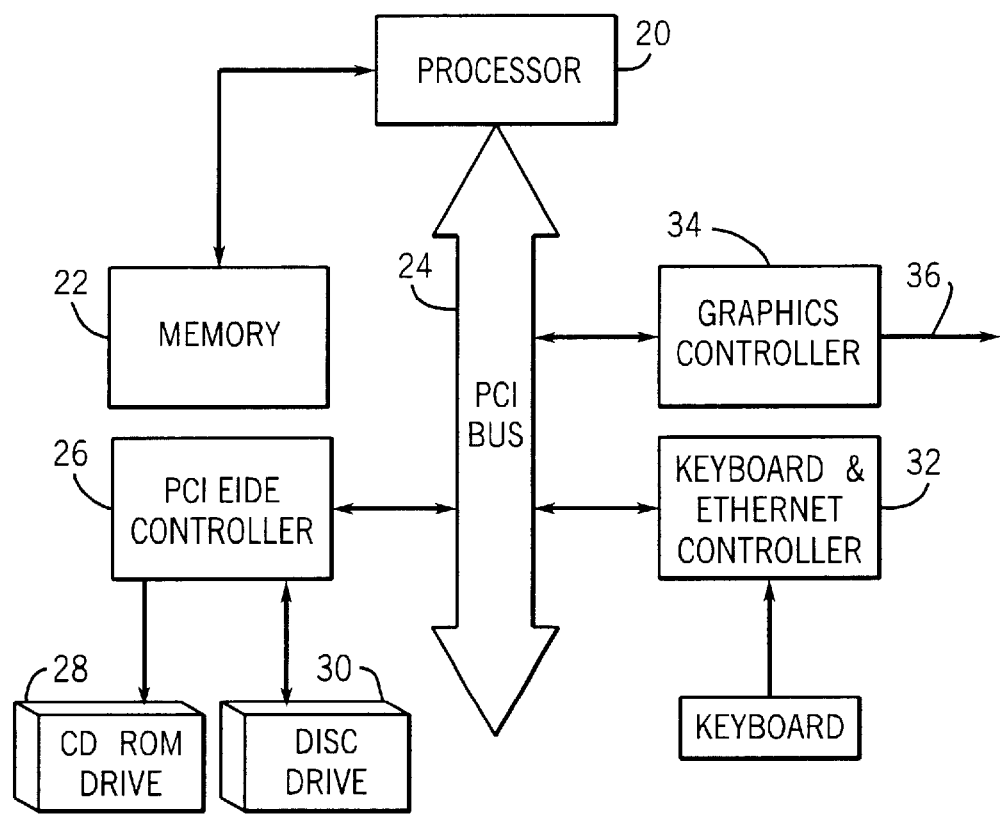
FIG. 2 is an electrical block diagram of the workstation of FIG. 1.

Referring particularly to FIG. 2, the workstation includes a processor 20 which executes instructions stored in a memory 22. The processor 20 is a commercially available device sold by Sun Microsystems, Inc. under the trademark UltraSPARC-IIi. It incorporates on-chip memory and I/O control to facilitate system integration. It is a superscalar processor implementing the SPARC-V9 64-bit RISC architecture and executing the instruction set sold commercially under the trademark "VIS". It also includes an integral PCI bus driver which provides a direct interface with a 32-bit PCI bus 24. It also includes integral memory management circuitry for handling all external memory 22.

The PCI bus 24 is an industry standard bus that transfers 32-bits of data at 33 MHz between the processor 20 and a number of peripheral controller cards. These include a PCI EIDE controller 26 which provides a high-speed transfer of data to and from a CD ROM drive 28 and a disc drive 30. A keyboard and Ethernet controller 32 supports data transfer with a number of peripheral devices, including input from the keyboard and mouse 14 and communication with Ethernet ports on medical imaging equipment. And finally, a graphics controller 34 couples the PCI bus 24 to the CRT monitor 12 through a standard VGA connection 36.

Figure 3:
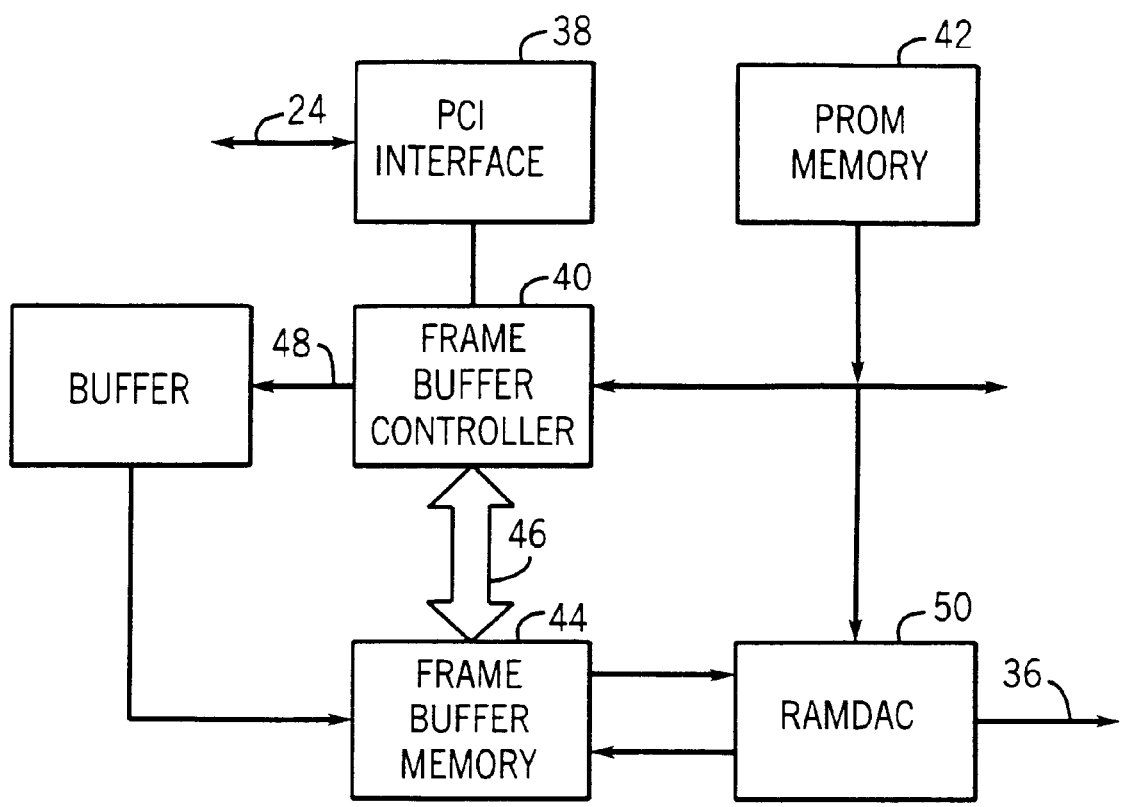
FIG. 3 is an electrical block diagram of a graphics controller which forms part of the workstation of FIGS. 1 and 2.

Referring particularly to FIG. 3, the graphics controller 34 is interfaced with the PCI bus 24 by a PCI interface 38. The graphics controller 34 provides 8-bit or 24-bit color high performance graphics functions to the user. In the preferred embodiment the graphics functions defined under the standard identified with the Silicon Graphics, Inc. trademark "OpenGL" are supported by the graphics controller 34. The graphics controller 34 includes a frame buffer controller 40 that operates in response to instructions stored in a PROM memory 42 to perform requested graphic functions. These functions include providing the latter half of 3D graphics rendering pipeline functions, providing acceleration for windowing functions and complex graphics applications. It also performs pixel processing to accelerate functionality such as transparency and antialiasing. It also provides rendering acceleration for dot, line, text, triangles, and fill patterns, as well as windowing functions, including fill, scroll, text, two and three dimensional vectors, and polygons.

Image data which is processed by the frame buffer controller 40 is stored in a frame buffer memory 44. The frame buffer 44 is coupled to the controller 40 by a 36-bit data bus 46, and image data is written to and read from the frame buffer 44 under the direction of control signals and address signals on a control bus 48. The frame buffer memory 44 is also connected to a RAMDAC circuit 50 which converts digital pixel values into analog signals and sends them through standard VGA connection 36 to the monitor 12. The RAMDAC 50 supports the simultaneous display of 8-bit and 24-bit color images and provides video timing for a number of different image resolutions.

Referring particularly to FIG. 2, medical images may be input to the workstation in a number of ways. In the preferred embodiment the workstation is connected directly to the medical imaging equipment through an Ethernet link. The image data is downloaded to the workstation through the Ethernet controller 32 and stored in memory 22. A number of image processing functions may be performed on the image data in the memory 22. A two-dimensional image may be displayed on the monitor 12 by transferring the two-dimensional array of pixel data to the graphics controller 34 which automatically produces the corresponding analog signals for the monitor 12.

Figure 4:
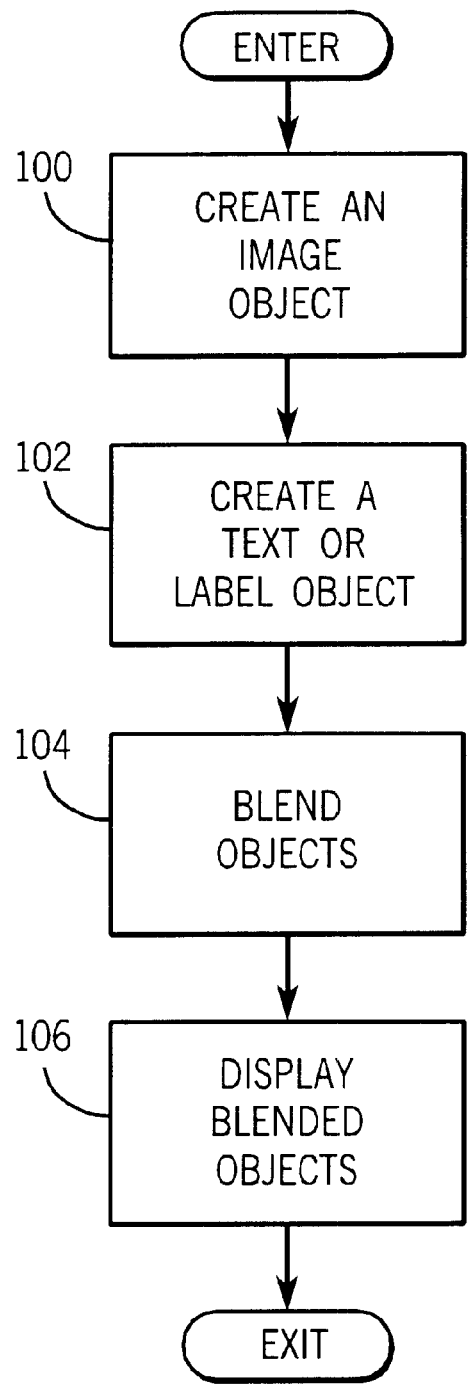
FIG. 4 is a flow chart which illustrates the steps used to practice the preferred embodiment of the invention.

Referring particularly to FIGS. 3 and 4, the array of image pixel data to be displayed is stored in the frame buffer memory 44. The frame buffer controller 40 operates in concert with the RAMDAC 50 to produce a corresponding display on monitor 12 as indicated at process block 100. Using the keyboard and mouse 14 the operator may create textual information or labels which are to be added to the displayed image as indicated at process block 102. This textual information may be, for example, information concerning the medical imaging system and the prescription used to acquire the image data, or it may be information about the patient or the anatomy depicted in the image. The text or label "objects" are rendered over the image object in the frame buffer memory 44 the pixel location indicated by a cursor visible on the displayed image. As indicated at process block 104, however, this rendering is accomplished by blending the text or label object with the corresponding pixel data in the underlying image object stored in the frame buffer memory 44. This blending operation is performed by the frame buffer controller 40 using alpha blending functions in the OpenGL® standard. As will be explained in more detail below, this alpha blending operation reads the image pixel data from the frame buffer memory 44, blends it with the text or label pixel data, and writes the combined pixel data back to the frame buffer memory 44. The alpha blending step is defined generally as follows:

$$\text{Blended pixel} = \text{image object} * \alpha + \text{text object} * (1-\alpha) \quad (1)$$

where α is a number less than 1 which determines the degree of transparency of the text object. In medical images an α of around 0.5 is preferred. The resulting blended image is displayed on the monitor 12 as indicated by process block 106 and it can be saved on the disc drive 30 for later reference or reproduction.

If α is known, blended text or labels can be removed from the image and the underlying medical image data fully restored. This restoration is performed by displaying the blended image and deleting the text or label information indicated by a cursor. The restoration function reverses the blending operation of equation (1) as follows:

$$\text{Image Object} = (\text{Blended pixel} - \text{Text object}*(1-\alpha))/\alpha. \quad (2)$$

Thus, if an image containing text or labels is edited to remove or change the text, the underlying medical image data is fully restored.

As indicated above, the blending operation is performed using the OpenGL® graphics software interface. This interface is described in detail in the "OpenGL Programming Guide", Third Edition, published in 1999 by Addison Wesley. This OpenGL® program performs the following functions.

A constant, $k_c$, is defined by the following equation $$K_A = 2^{m-1} \quad (3)$$

where m is the number of bitplanes in the alpha component (e.g. the number of red bitplanes).

The source scale factor, $S_A$, is defined as:

$$s_A = \frac{A_s}{k_A} \quad (4)$$

where:
  $A_s$ is the alpha value for the source,
  $k_A$ is defined according to equation 1.
  The destination scale factor, $d_A$, is defined as:

$$d_A = 1 - \frac{A_s}{k_A} \quad (5)$$

where:
  $A_s$ is the alpha value for the source.
  $k_A$ is defined according to equation 3.
  The destination value for a particular component is defined as:

$$C_d = \min(k_A, C_s S_A + C_{d-1} d_A) \quad (6)$$

where:
  $C_{d-1}$ is the previous destination value of a single component (red, blue, green, or alpha of the image.
  $C_s$ is the source value of a single component of the image. $C_s, C_d$, and $C_{d-1}$ must be for the same component (e.g. both red).
  Substituting equations 4 and 5 in equation 6 yields:

$$C_d = \min\left(k_A, C_s\left(\frac{A_s}{k_A}\right) + C_d\left(1 - \frac{A_s}{k_A}\right)\right) \quad (7)$$

The above equations are applied independently to each of the four components (red, green, blue, and alpha) of the image and text to create the final rendered scene.

What is claimed is:

1. A method for producing an image, the method comprising:
   a) producing a digital image comprised of an array of pixel values;
   b) producing text data comprised of a plurality of pixel values;
   c) blending the text data with selected pixel values in the digital image;
   d) displaying the blended digital image such that an object depicted by the text data is semi-transparently displayed over the object depicted by the digital image; and
   e) erasing the object depicted by the text data from the blended digital image by calculating from the blended pixel values the corresponding digital image pixel values, and displaying the resulting digital image.

2. The method as recited in claim 1 in which the digital image is produced by a medical imaging system and the object depicted by the digital image is human anatomy.

3. The method as recited in claim 2 in which the text data depicts alpha-numeric characters.

4. The method as recited in claim 1 in which the blending step is performed by multiplying one of said text data pixel values or digital image pixel values by a factor ($\alpha$) and summing that product with the product of the other of said text data pixel values or digital image pixel values and the factor ($1-\alpha$).

5. The method as recited in claim 2 in which the text data depicts information about the human anatomy depicted in the digital image.

6. The method as recited in claim 2 in which the text data depicts information about the medical imaging system which produced the digital image.

7. A graphic workstation which comprises:

means for receiving and storing a digital image comprised of an array of pixel values;

means for producing text data comprised of a plurality of pixel values;

means for blending the text data with selected pixel values in the digital image;

means for displaying the blended digital image such that an object depicted by the text data is displayed semi-transparently over an object depicted by the digital image; and means for erasing the object depicted by the text data from the blended digital image by calculating from the blended pixel values the corresponding digital image pixel values.

8. The workstation as recited in claim 7 in which the means for receiving is connected to receive medical images from a medical imaging system.

9. The workstation as recited in claim 8 in which the means for producing text data includes a keyboard which enables alpha-numeric characters to be produced.

10. The workstation as recited in claim 7 in which the means for blending includes:

means for multiplying one of said text data pixel values or digital image pixel values by a factor ($\alpha$);

means for multiplying the other of said text data pixel values or digital image pixel values by a factor ($1\alpha$); and means for summing the products of the two multiplying means.

11. The workstation as recited in claim 10 in which the factor $\alpha$ is less than 1.0.

12. The workstation as recited in claim 10 in which the factor $\alpha$ is approximately 0.5.

* * * * *